(12) United States Patent
Salvoni

(10) Patent No.: US 6,981,581 B2
(45) Date of Patent: Jan. 3, 2006

(54) DIVERTER

(75) Inventor: Paolo Salvoni, Corte Franca (IT)

(73) Assignee: CFS Palazzolo S.p.A., Palazzolo (IT)

( * ) Notice: Subject to any disclaimer, the term of this patent is extended or adjusted under 35 U.S.C. 154(b) by 0 days.

(21) Appl. No.: 10/839,810

(22) Filed: May 5, 2004

(65) Prior Publication Data

US 2005/0247542 A1 Nov. 10, 2005

(51) Int. Cl.
*B65G 47/68* (2006.01)

(52) U.S. Cl. .................. 198/436; 198/437; 198/370.07

(58) Field of Classification Search ................ 198/367, 198/442, 370.07, 431, 434, 436, 437, 461.2
See application file for complete search history.

(56) References Cited

U.S. PATENT DOCUMENTS

| | | | | | |
|---|---|---|---|---|---|
| 1,898,662 | A | * | 2/1933 | Dawson et al. | 198/442 |
| 2,036,421 | A | * | 4/1936 | Luckie | 198/442 |
| 2,515,871 | A | * | 7/1950 | Hartmann | 198/442 |
| 3,008,564 | A | * | 11/1961 | Lakso | 198/442 |
| 4,440,289 | A | * | 4/1984 | Weis | 198/437 |
| 5,209,339 | A | * | 5/1993 | Antonissen | 198/436 |

\* cited by examiner

*Primary Examiner*—James R. Bidwell
(74) *Attorney, Agent, or Firm*—Perman & Green, LLP

(57) ABSTRACT

The present invention relates to a machine for dividing one incoming lane of containers into a first and a second lane of containers.

6 Claims, 1 Drawing Sheet

DIVERTER

Figure 1:
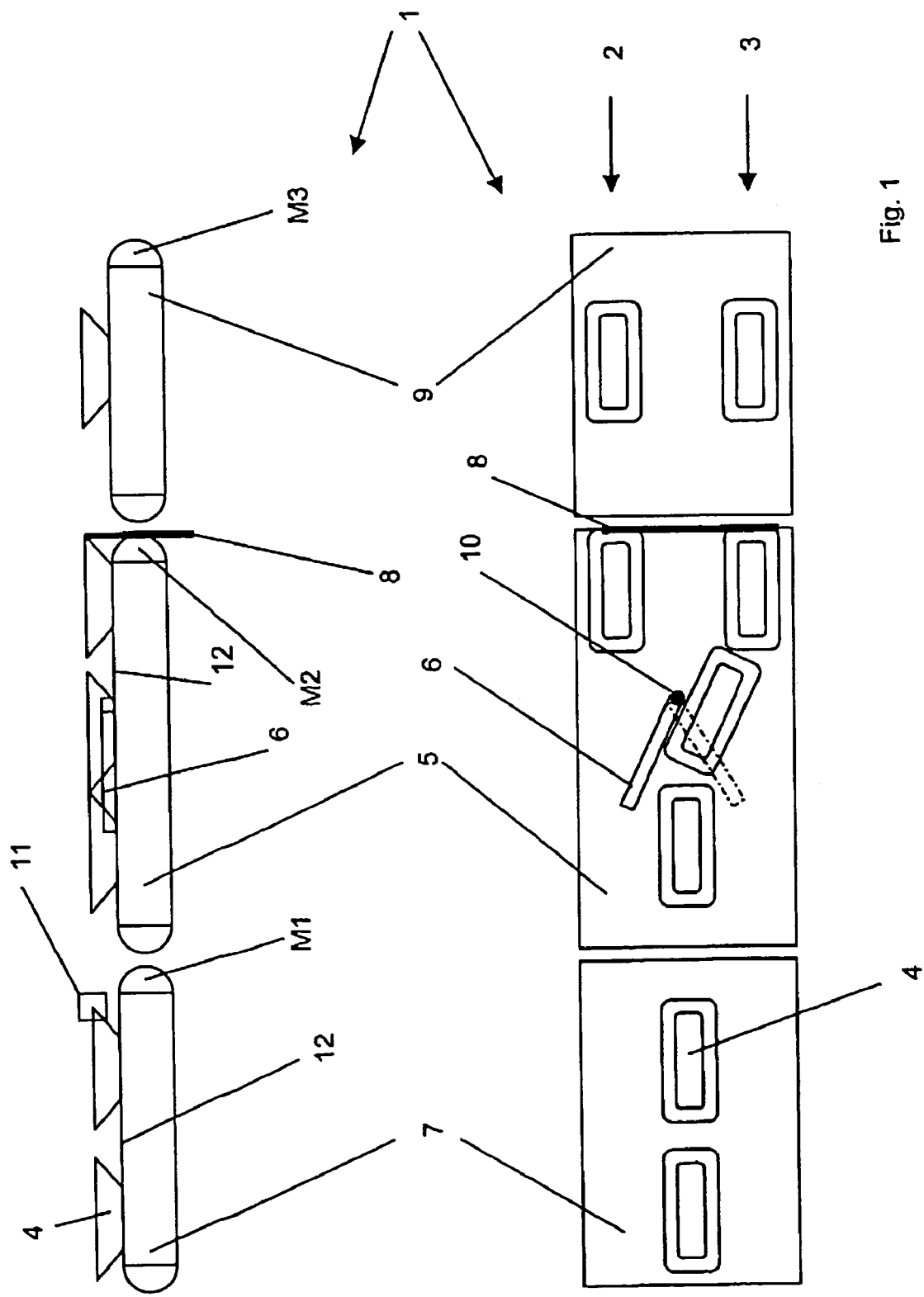

The present invention relates to a machine for dividing one incoming lane of containers into a first and a second lane of containers.

Goods, especially food, is nowadays often packaged into containers which are sealed with a film after the food has been inserted into the containers. This packaging of the goods can be carried out for example on a so-called tray sealer, which is known for example from EP 01 680 880. In order to increase the performance of these machines, especially the sealing, two ore more parallel lanes of containers are to be sealed simultaneously. Therefore, one incoming lane of containers has to be split into a first and into a second lane of containers.

It is therefore the objective of the present invention to provide a machine for dividing one incoming lane of containers into a first and a second lane of containers.

The problem is solved with a machine according to claim 1. Preferred embodiments of the machine are claimed in the dependent claims 2–5.

It was totally surprising and could not have been expected by a person skilled in the art that the inventive machine allows to split an incoming lane of containers into a first and a second lane easily. The inventive machine is easily built and operated.

The machine according to the present invention divides an incoming lane of containers into a first and a second lane of containers. However, the person skilled in the art understands that there can be more incoming lanes of containers and more resulting lanes of containers. The division of the incoming lane of containers is executed with a shifter that is preferably located above the transportation plane of the containers. This shifter can be any means that is capable of guiding or pushing the incoming lane(s) either the direction of the first or the second lane. The inventive machine further comprises a first transportation means that operates at a first velocity. Preferably, this velocity is constant. However, it is possible to vary the speed of this transportation means in order to in- or decrease the distance between the incoming containers.

In a preferred embodiment, the machine further comprises a second transportation means that is located upstream of the first transportation means and that is operated at a second transportation velocity which is lower than the first transportation velocity. Preferably, this velocity is constant and regulates the flux (containers per minute) which are fed to the diverter.

More preferably, the machine comprises a sensor that is more preferably located in the vicinity of the second transportation means and detects containers on the second transportation means. This information is preferably transmitted to a central control unit that, among others, controls the motion of the shifter. This control unit calculates the time, preferably the last instant, at which the motion of the shifter has to be initiated or completed in order to guide or push the containers into the direction of the respective lane.

In a preferred embodiment of the present invention, the machine comprises a third transportation means that is located downstream of the first transportation means and that operates at a higher velocity than the first transportation means. This transportation means, the so-called extraction belt, quickly moves the first and the second lane of containers away from the shifter unit in the direction of the sealing unit. In a preferred embodiment of the present invention, the third transportation means does not have an own motor but is driven by the motor of the first transportation means. In order to achieve a higher transportation velocity than in the first transportation means, a gear has to be included into the machine. In another preferred embodiment of the present invention, the third transportation means has an own motor, which drives the third transportation means at a higher speed than the first transportation means.

Preferably, the machine comprises an alignment gate that is more preferably located between the first and the third transportation means. This alignment gate can be, for example, a bar that can be lowered or raised.

Transportation means according to the present invention can be any means which allow the transportation of food containers. Preferably, the transportation means are conveyor belts, whereas, in this case, the transportation plane is the outer surface of the belt.

Further characteristics and advantages of the present invention will become apparent from the following detailed description of FIG. 1 which is, however, a non-restricting example of the present invention.

The inventive machine is depicted in FIG. 1 and comprises three transportation means which are conveyor belt 5, 7, 9. Conveyor belt 7 is driven by motor M1, conveyor belt 5 by motor M2 and conveyor belt 9 by motor M3. The third transportation belt does not necessarily have an own motor, but can be driven by motor M2. Conveyor belt 7, the second transportation means, is driven at a constant speed, for example 25 meters per minute. With this belt, the flux (containers per minute) to the diverter and later to the sealing unit is regulated. Conveyor belt 5, the first transportation means, is operated at a higher velocity than conveyor belt 7, for example at 48 meters per minute. Thus, when a container 4 is handed over from conveyor belt 7 to conveyor belt 5, the distance between two adjacent containers is increased due to the higher velocity of the conveyor belt 5. Conveyor belt 9 is operated even at a higher velocity than conveyor belt 5, in order to quickly move the containers away from the conveyor belt 5. The machine further comprises a shifter 6 which is located above the transportation plane 12 of conveyor belt 5. The shifter is rotatable clockwise and counterclockwise around an axis of rotation 10. The rotational motion of the shifter 6 is controlled by a control unit (not depicted). The shifter directs and/or pushes the containers either to the first lane 2 or the second lane 3 in order to divert the incoming flux of containers into two lanes. The shifter is depicted in two positions. The shifter depicted with a continuous line, shows its position to guide the containers to lane 3. The shifter depicted with a dotted line, shows its position to guide the containers to lane 3. The inventive machine further comprises alignment means 8 which can be raised or lowered. While being raised, the alignment means function as a barrier. The containers 4, which are in touch with the alignment means, are not further transported. As soon as two containers have touched the alignment means 8 and/or as soon as the distance between these containers and the next container downstream is correct, the alignment means 8 are lowered in order to let these containers pass. Immediately afterwards, it is raised again in order to stop the next row of containers. In the vicinity of conveyor belt 7, the inventive machine comprises a sensor, that detects the presence of a container 4 on belt 5. This information is transmitted to a control unit that among others controls the motion of shifter 6. Preferably, the shifter is moved in the very last instance, that still allows the guidance and/or displacement of the respective container in the direction of the respective lane, which is especially advantageous, when the distance between the containers is very small.

The person skilled in the art understands that the inventive machine does not necessarily must comprise conveyor belts 7 and 9 and the alignment means 8. It is sufficient that it comprises transportation means 5 and a shifter 6.

The depicted machine works as follows: an incoming lane of containers 4 are transported with conveyor belt 7 from the left to the right. The sensor 11 detects the position of the containers on conveyor belt 7 and transmits this information to a central control unit that controls the shifter. Based on this information, the control unit calculates the instant when the shifter has to be shifted in order to either guide the respective container to the first lane 2 or the second lane 3. After the containers have been handed over from conveyor belt 7 to conveyor belt 5, they are transported in the direction of the shifter 6. The shifter either guides or pushes the respective container to the respective lane 2, 3. The pushing takes especially place when the position of the shifter is changed. After the containers have been either guided and/or pushed to the first lane 2 or the second lane 3, they are further transported until they hit alignment means 8. As soon as at least one container has hit the alignment means and the distance to the next containers downstream is correct, the alignment means are lowered so that the containers are handed over to the acceleration belt 9 which quickly moves the containers 4 away from the conveyor belt 5.

REFERENCE LIST

1 Machine
2 First lane
3 Second lane
4 Container
5 First conveyor belt
6 Shifter
7 Second conveyor belt
8 Alignment means
9 Third conveyor belt
10 Access of rotation
10 Sensor
M1, M2, M3 Motor
12 Transportation plane

What is claimed is:

1. A Machine for dividing one incoming lane of containers into a first and a second lane of containers, comprising:
   a first transportation means having transportation plane and providing a first transport path;
   a second transportation means located upstream of the first transportation means and having a second transport path;
   a shifter, mounted in or above the transportation plane, is rotatable about an axis perpendicular to the transportation plane for guiding the containers either to the first lane or to the second lane;
   characterized in, that the containers are transported with a first velocity on the first transportation means and with a second velocity on the second transportation means, the second velocity being lower than the first velocity, and wherein said first and second transport paths are aligned and said first and second lanes are on the first transportation means.

2. A machine, according to claim 1, characterized in that the first velocity is variable.

3. A machine according to claim 1, characterized in, that it comprises a sensor, that detects the containers on the second transportation means.

4. A machine according to claim 1, characterized in, that it comprises a third transportation means, that is located downstream of the first transportation means, said third transportation means providing a third transport path aligned with the first transport path and that operates at a higher velocity than the first transportation means.

5. A machine according to claim 4, characterized in that, it comprises an alignment gate that is located between the first and the third transportation means.

6. A machine, according to claim 4, characterized in that it comprises a sensor that detects the containers on the second transportation means and that the information from the sensor is transmitted to a central control unit, that calculates the time, at which the motion of the shifter has to be initiated and that controls the motion of the shifter.

* * * * *